United States Patent
Broughton et al.

(10) Patent No.: US 10,624,329 B2
(45) Date of Patent: Apr. 21, 2020

(54) FISHING LINE INDICATION DEVICE

(71) Applicants: Andy Broughton, St. Augustine, FL (US); Debra Broughton, St. Augustine, FL (US)

(72) Inventors: Andy Broughton, St. Augustine, FL (US); Debra Broughton, St. Augustine, FL (US)

(*) Notice: Subject to any disclaimer, the term of this patent is extended or adjusted under 35 U.S.C. 154(b) by 277 days.

(21) Appl. No.: 15/812,389

(22) Filed: Nov. 14, 2017

(65) Prior Publication Data

US 2019/0141976 A1    May 16, 2019

(51) Int. Cl.
    *A01K 97/12*    (2006.01)
(52) U.S. Cl.
    CPC .................. *A01K 97/12* (2013.01)
(58) Field of Classification Search
    CPC ......... A01K 97/12; A01K 93/02; A01K 97/00
    USPC .............................................. 43/17
    See application file for complete search history.

(56) References Cited

U.S. PATENT DOCUMENTS

| | | | | |
|---|---|---|---|---|
| 3,023,532 A * | 3/1962 | Gorenty | ................. | A01K 97/12 43/17 |
| 3,057,105 A * | 10/1962 | Moses | ................... | A01K 97/12 43/16 |
| 3,069,802 A * | 12/1962 | Olsen | ..................... | A01K 95/00 43/44.95 |
| 3,357,126 A * | 12/1967 | Klieves | ................. | A01K 91/08 43/43.12 |
| 3,408,701 A * | 11/1968 | Decker | .................. | A01K 95/02 24/600.9 |
| D222,640 S * | 11/1971 | Mayer | .......................... | D22/134 |
| 3,881,270 A * | 5/1975 | Olcott | ................... | A01K 97/125 43/17 |
| 4,020,579 A * | 5/1977 | Snider | .................... | A01K 97/12 43/17 |
| 4,194,936 A * | 3/1980 | Martuch | ................ | A01K 93/00 156/166 |
| 4,280,295 A * | 7/1981 | Hoeving | .............. | A01K 91/065 43/19.2 |
| 4,447,979 A * | 5/1984 | Taylor | .................. | A01K 97/125 43/17 |
| 4,538,373 A * | 9/1985 | Rogers | ................... | A01K 91/08 43/43.12 |
| 4,552,318 A * | 11/1985 | Durham | ................. | A01K 97/12 242/224 |

(Continued)

FOREIGN PATENT DOCUMENTS

| GB | 2406772 A | * | 4/2005 | ............ A01K 97/12 |
|---|---|---|---|---|
| GB | 2507258 A | * | 4/2014 | |

(Continued)

*Primary Examiner* — Claude J Brown
(74) *Attorney, Agent, or Firm* — Jason T. Daniel, Esq.; Daniel Law Offices, P.A.

(57) ABSTRACT

A fishing line indication device includes a pair of identically shaped body sections that are secured together along a top end by a connector. The body sections include front ends and bottom ends that are selectively engaged to receive a fishing line. A plurality of markings are positioned along the outside surfaces of the first and second body sections. The front ends have a curvilinear shape and the bottom ends have a round shape. The round and curvilinear shapes rotate the first and second body sections along a fishing pole to which the fishing line is attached.

11 Claims, 5 Drawing Sheets

(56) References Cited

U.S. PATENT DOCUMENTS

| | | | | |
|---|---|---|---|---|
| 4,939,864 A * | 7/1990 | Bowles | A01K 97/12 | |
| | | | | 43/17 |
| 5,125,182 A * | 6/1992 | Holder | A01K 85/00 | |
| | | | | 43/42.36 |
| 5,216,831 A * | 6/1993 | Halterman, Jr. | A01K 93/00 | |
| | | | | 43/44.91 |
| 5,515,639 A * | 5/1996 | Phipps | A01K 97/12 | |
| | | | | 43/17 |
| D373,171 S * | 8/1996 | Negreanu | D22/139 | |
| 5,735,073 A * | 4/1998 | Kuhlman | A01K 97/12 | |
| | | | | 43/17 |
| 5,839,218 A * | 11/1998 | Cafarella | A01K 97/12 | |
| | | | | 43/17 |
| 5,884,429 A * | 3/1999 | Cube | A01K 97/12 | |
| | | | | 43/17 |
| 6,478,439 B1 * | 11/2002 | Rockwell | A01K 85/01 | |
| | | | | 362/34 |
| 6,836,994 B1 * | 1/2005 | Fulper | A01K 97/12 | |
| | | | | 43/17 |
| 6,857,221 B2 * | 2/2005 | Johnson | A01K 93/00 | |
| | | | | 43/17 |
| 7,963,065 B1 * | 6/2011 | Copeland | A01K 97/12 | |
| | | | | 43/16 |
| 8,161,678 B1 * | 4/2012 | DeLucca | A01K 93/02 | |
| | | | | 43/17 |
| 9,420,774 B1 * | 8/2016 | Antonio | A01K 97/125 | |
| 2011/0095894 A1 * | 4/2011 | Gibson | A01K 97/125 | |
| | | | | 340/573.2 |
| 2011/0203156 A1 * | 8/2011 | Christiansen | A01K 93/00 | |
| | | | | 43/17 |
| 2012/0055072 A1 * | 3/2012 | Rankin | A01K 91/08 | |
| | | | | 43/43.13 |
| 2012/0055962 A1 * | 3/2012 | Lee | A45F 5/02 | |
| | | | | 224/191 |
| 2014/0190066 A1 * | 7/2014 | Bono | A01K 95/00 | |
| | | | | 43/43.12 |
| 2016/0270385 A1 * | 9/2016 | Stearman | A01K 97/06 | |

FOREIGN PATENT DOCUMENTS

| | | | | |
|---|---|---|---|---|
| GB | 2523826 B | * | 4/2016 | A01K 97/12 |
| GB | 2518875 B | * | 5/2018 | |

* cited by examiner

FISHING LINE INDICATION DEVICE

TECHNICAL FIELD

The present invention relates generally to fishing accessories, and more particularly to a fishing line indication device.

BACKGROUND

The statements in this section merely provide background information related to the present disclosure and may not constitute prior art.

When surf fishing, it is not uncommon for an angler to use multiple fishing poles at one time. In this regard, each of the poles are typically secured within a handsfree rod holder that positions each pole in an upright orientation with the fishing line extending past the shore and into the water.

The use of multiple poles is highly advantageous to the fisherman, as it increases the chance of a successful catch. To this end, when a fish engages the rig on one of the poles, the bait clicker of the fishing rod will emit a sound that advises the user they have a fish. Unfortunately, such devices do not provide a visual indication to the fisherman. As such, when multiple poles are in use, it is often difficult for the angler to quickly identify which pole has the fish, and such a delay may cause the fish to escape.

In addition to the above, shore fisherman must be on the constant lookout for bystanders who may become unintentionally snared by the invisible or nearly invisible fishing line extending from each pole. This is especially true at crowed locations such as beaches, for example, where the bystanders may not notice the fishing rigs and may literally walk directly into one of the fishing lines.

Accordingly, it would be beneficial to provide a device that can be removably secured onto a fishing line to provide a visual indication of the lines' presence to a bystander, and to provide a visual indication of line movement to a user, in order to alleviate the above noted deficiencies.

SUMMARY OF THE INVENTION

The present invention is directed to a fishing line indication device. One embodiment of the present invention can include a pair of identically shaped body sections having a connector along the top end and an inside surface for receiving and engaging a fishing line. The body sections can include a front end and a bottom end that are suspended below the fishing line, and a plurality of markings are disposed along the outside surface of the body sections.

In one embodiment the front end includes a curvilinear shape and the bottom end is rounded. As the fishing line is reeled toward a fishing pole, the bottom and front ends engage the fishing pole to rotate the first and second body sections. When the body sections reach an inverted or nearly inverted state, the fishing line is released and the body sections fall from the line.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
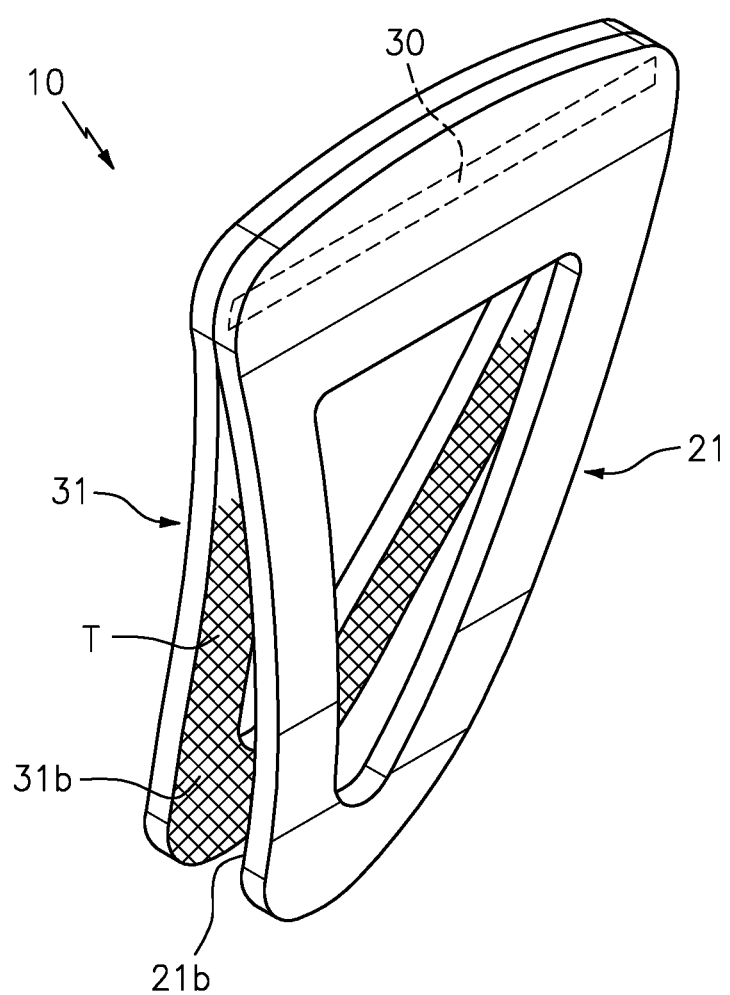
FIG. 1 is a perspective view of a fishing line indication device in the open orientation that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Various embodiments of a fishing line indication device 10 are provided throughout the drawings. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 illustrates one embodiment of the fishing line indication device in an open orientation, that is useful for understanding the inventive concepts disclosed herein. As shown, the device 10 can include a first body section 21 and second body section 31 that are secured together via a connector 30 along the respective top ends. As will be described below, the device is constructed so as to be suspended from a fishing line so as to provide a visual indication of the line presence and movement.

Figure 3:
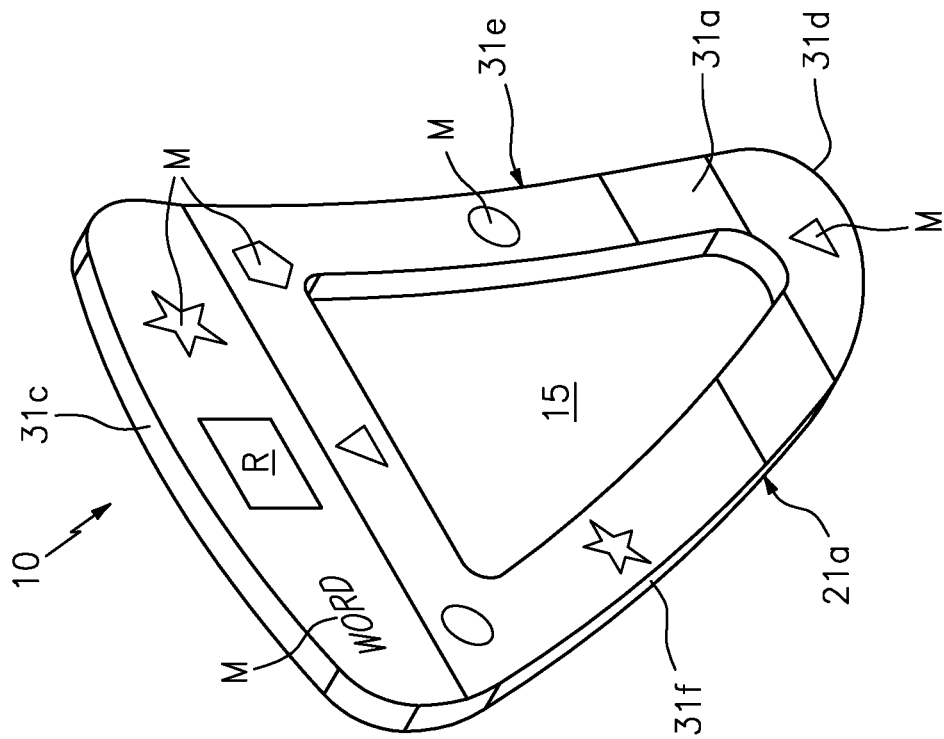
FIG. 3 is a back side view of the fishing line indication device, in accordance with one embodiment of the invention.
Figure 2:
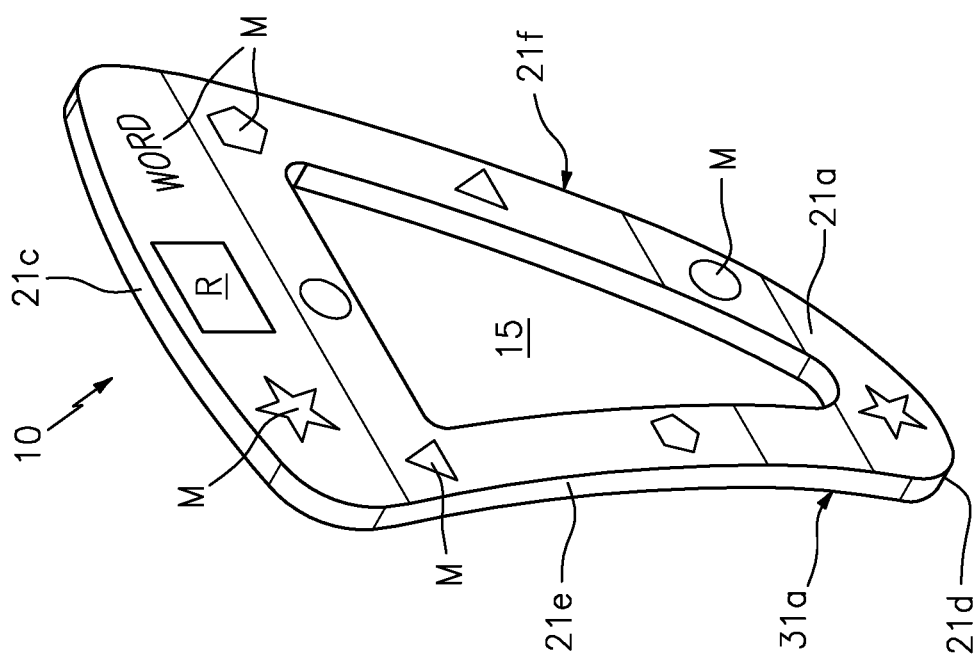
FIG. 2 is a front side view of the fishing line indication device, in accordance with one embodiment of the invention.

As shown in FIGS. 2 and 3, the first and second body sections can each include a generally fin-shaped member having an outside facing surface 21*a* and 31*a*, an inside facing surface 21*b* and 31*b*, a planar top end 21*c* and 31*c*, a rounded bottom end 21*d* and 31*d*, a front end 21*e* and 31*e*, and a back end 21*f* and 31*f*, respectively. As shown, each of the front ends 21*e* and 31*e* can include a curvilinear and generally concave shape that extends from the bottom ends 21d and 31d to the top ends 21c and 31c.

As shown, the top ends 21c and 31c are secured together via a connector 30. The connector can function to compress the top ends together, so as to maintain the device in the closed orientation shown in FIGS. 2 and 3, which allows the device to be suspended from a fishing line in the manner described below. As described herein, the connector 30 can include any number of different elements capable of securing the two body sections together in either a permanent or a nonpermanent manner. Several nonlimiting examples of suitable connectors include adhesives (i.e., glue and resin), welds, staples, rivets and other known types of compression fittings, for example.

In one embodiment, each of the inside facing surfaces 21b and 31b can include an abrasive, uneven, rough, and/or textured surface T, and/or can include a secondary material such as rubber, for example, along a portion or an entirety thereof. Such a surface functions to apply sufficient friction between the main body sections that can be applied onto a fishing line positioned therebetween. The friction acts to prevent the device from sliding downward and/or otherwise moving relative to the fishing line during operation.

As described herein, each of the main body sections 21 and 31 can be formed from any number of resilient, slightly stiff and lightweight (e.g., 0.25 to 1.5 ounces) materials. The lightweight nature of the device being advantageous so as to not affect the ability of the fishing line to which it is attached to move or sag during use.

In the preferred embodiment, the connector can comprise permanent non-toxic glue, and each of the main body sections 21 and 31 can be constructed from a biodegradable material such as cardboard, for example, that is naturally abrasive to impart friction on the line, as described above. Such materials are advantageous and important, so as to ensure the device will not have a deleterious effect on the environment should it become separated from the fishing line and fall into the water. Of course, many other construction materials are also contemplated.

In various embodiments, the outside facing surfaces 21a and 31a can each include any type of markings M to increase the visibility of the device. As described herein, the markings can include any number of different colors, words, shapes, symbols, logos, designs, and/or patterns, for example. The markings can also include any number of reflectors R and/or light emitting materials such as glow in the dark paint, for example. These elements can be secured onto and/or into the main body in accordance with known techniques so as to be flush with the surface of the main body or can be recessed, raised and/or protruding outward from the main body so as to give a three dimensional effect.

In one embodiment, the device 10 can include at least one wind slit 15. As shown, the wind slit can preferably comprise identically shaped, sized and located apertures along the body sections 21 and 31, so as to be uniform in appearance. As will be described below, the device is designed to remove itself from a fishing line that is being reeled toward a fishing pole. As such, the wind slit(s) allow air to pass transversely through the main body sections to reduce or prevent movement and rotation of the device relative to the fishing line, as such a situation could result in premature separation of the device from the fishing line.

Although described above with regard to particular shapes, sizes and/or construction materials, those of skill in the art will recognize that many other shapes, sizes and construction materials can also be utilized.

Figure 4A:
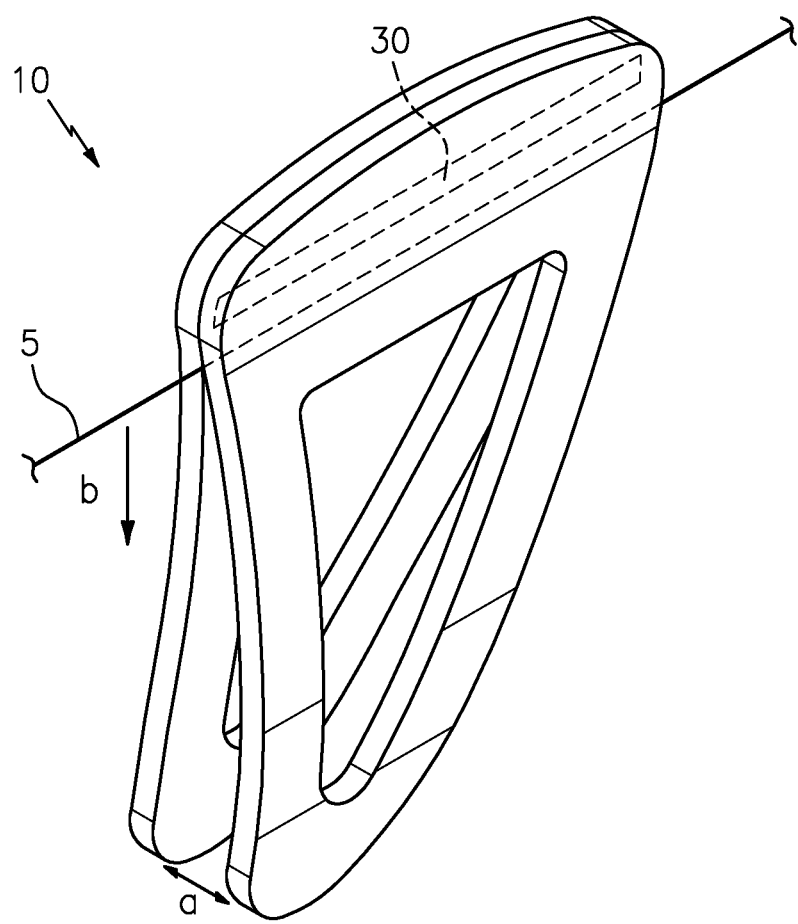
FIG. 4A is a perspective view of the fishing line indication device in operation, in accordance with one embodiment of the invention.
Figure 4B:
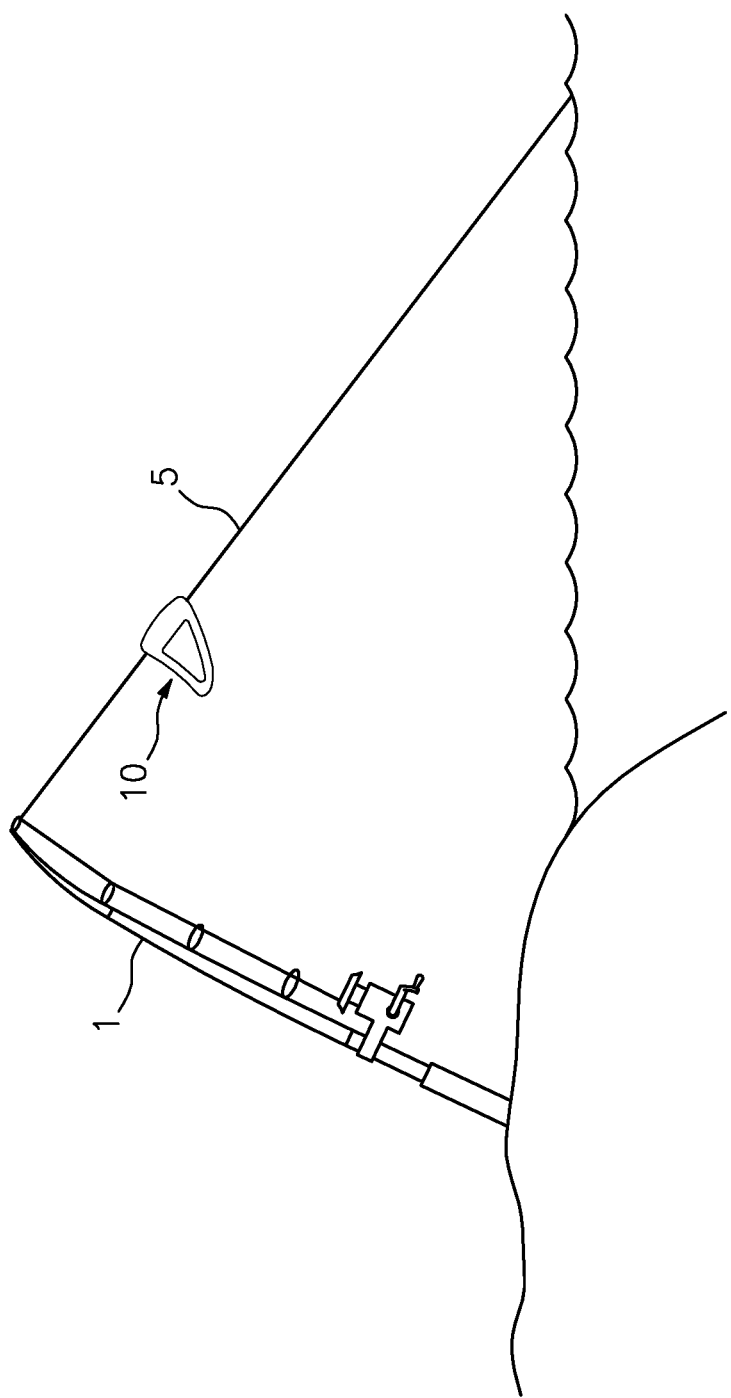
FIG. 4B is another perspective view of the fishing line indication device in operation, in accordance with one embodiment of the invention.

FIGS. 4A and 4B illustrate one embodiment of the device 10 in operation. As shown, the device can be positioned onto a fishing line 5, so as to create a clear visual indication as to the location of the line. In this regard, body sections 21 and 31 can be separated (see arrow a) to allow a fishing line 5 to be positioned between the inside facing surfaces 21b and 31b.

Owing to the location of the connector 30, the top ends of surfaces 21b and 31b are compressed more tightly together than the bottom ends. As such, the closer the fishing line 5 is positioned to the connector 30, (arrow b) the more friction each of the surfaces applies to the line, and the more immobile the device becomes. To this end, the user can position one or more of the devices 10 at any desirable location along the length of the fishing line. When so positioned, the device will remain fixed to the line, so as to provide a stable visual indicator of the presence of a fishing line to any bystanders nearby. Additionally, when a fish engages the line, the device will move, shake and vibrate with the line, so as to provide a clear visual indication to the user that a particular line has caught a fish.

Figure 5A:
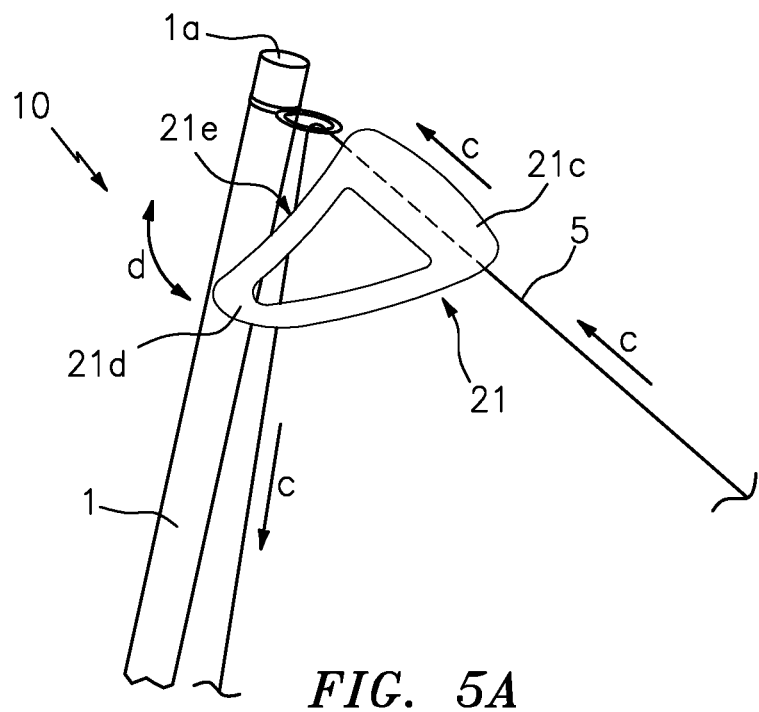
FIG. 5A is another perspective view of the fishing line indication device in operation, in accordance with one embodiment of the invention.
Figure 5B:
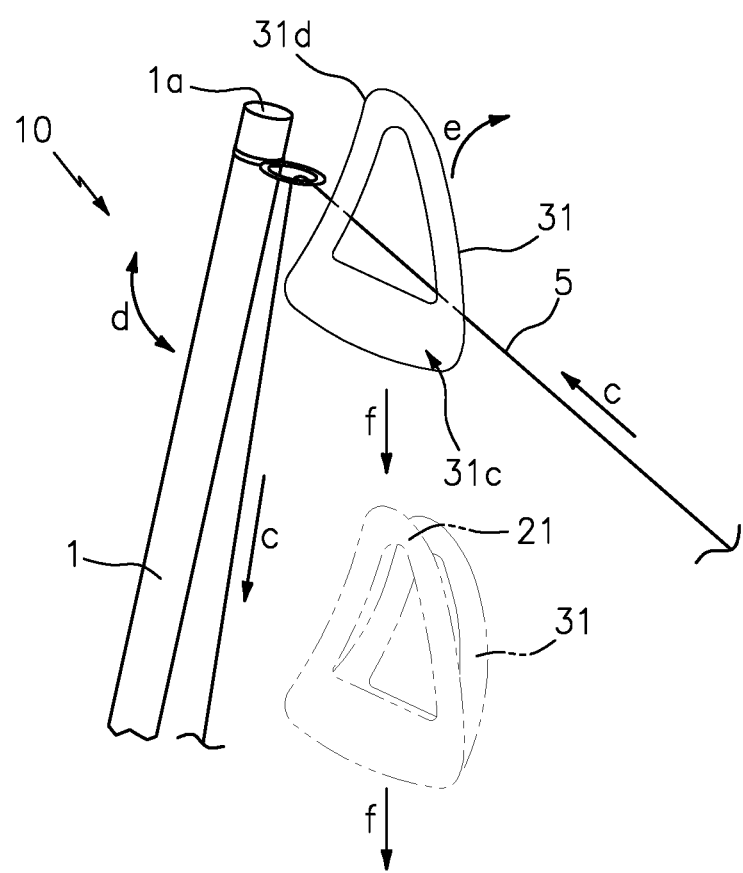
FIG. 5B is another perspective view of the fishing line indication device in operation, in accordance with one embodiment of the invention.

As shown in FIGS. 5A and 5B, the device 10 also includes functionality for automatically separating itself from the fishing line 5 when the line is reeled toward the fishing pole 1. To this end, as the fishing line 5 moves (arrow c) toward the distal end of the fishing pole 1a, the device will remain secured onto the line and will move with the line. As noted above, the front ends 21e and 31e are curvilinear in nature, as such, the rounded bottom end 21d will be the first portion of the main body to make contact with the fishing pole, and will pass along either the left or right side of the pole (see arrow d) as the top of the body continues to be reeled toward the pole with the fishing line (arrow c).

Owing to the presence of the connector 30 and/or reflectors R along the top end of the device, the top end is slightly heavier than the bottom end. Therefore, as this movement continues, the curved nature of the front end will cause the main body to rotate to an inverted state (arrow e) at which time gravity will pull the device downward (arrow f), thereby separating the line 5 from the inside surfaces, and causing the device to fall from the line and land adjacent to the base of the fishing pole.

Such a feature advantageously provides the user with a clear visual indication when a fish has engaged the line, and further allows the user to immediately begin reeling the line without having to remove or otherwise access the device itself.

As described herein, one or more elements of the fishing line indication device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the first body section 21, the second body section 31 and the connector 30, for example, may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A fishing line indication device, comprising:
a first body section having an inside surface, a top end, a bottom end, and a front end;
a second body section having an inside surface, a top end, a bottom end, and a front end; and
a connector that is positioned along the top ends of the first and second body sections, said connector imparting a pressing force to pull the inside facing surfaces of the first and second body sections together,
wherein the bottom ends and the front ends of the first and second body sections are configured to be selectively separated to receive a fishing line between the inside facing surfaces of the first and second body sections,
wherein the first and second body sections include identical shapes, and are positioned in a parallel orientation to each other,
said connector being positioned perpendicular to a major axis of the first and second body sections, and
said connector being configured to suspend the bottom ends of the first and second body sections beneath the fishing line.

2. The device of claim 1, wherein the bottom ends of the first and second body sections include a rounded shape that is configured to engage a first side of a fishing pole to which the fishing line is being reeled.

3. The device of claim 2, wherein the front ends of the first and second body sections include a curvilinear shape that is configured to rotate the first and second body sections about the first side of the fishing pole.

4. The device of claim 3, wherein the curvilinear shape comprises a concave curve, and the first and second body sections are configured to release the fishing line when the first and second body sections are rotated to an inverted state.

5. The device of claim 1, wherein the inside facing portions of the first and second body sections include a textured surface for engaging the fishing line.

6. The device of claim 1, wherein the connector comprises a permanent connector that spans an entirety of the top end of the first and second body sections.

7. The device of claim 1, wherein the main body sections are constructed from biodegradable material and the connector comprises a non-toxic adhesive.

8. The device of claim 1, further comprising:
a plurality of markings that are disposed along an outside facing surface of one of the first and second body sections.

9. The device of claim 1, further comprising:
at least one reflective marker that is disposed along an outside facing surface of one of the first and second body sections.

10. The device of claim 1, further comprising:
at least one wind slit that is positioned along the first and second body sections.

11. A fishing line indication device, comprising:
a first body section having an inside surface, a top end, a bottom end, and a front end;
a second body section having an inside surface, a top end, a bottom end, and a front end; and
a connector that is positioned along the top ends of the first and second body sections, said connector imparting a pressing force to pull the inside facing surfaces of the first and second body sections together,
wherein the bottom ends and the front ends of the first and second body sections are configured to be selectively separated to receive a fishing line between the inside facing surfaces of the first and second body sections,
wherein the bottom ends of the first and second body sections include a rounded shape that is configured to engage a first side of a fishing pole to which the fishing line is being reeled
wherein the front ends of the first and second body sections include a curvilinear shape that is configured to rotate the first and second body sections about the first side of the fishing pole, and
wherein the curvilinear shape comprises a concave curve, and the first and second body sections are configured to release the fishing line when the first and second body sections are rotated to an inverted state.

* * * * *